July 9, 1957 P. F. MARSHALL 2,798,725
APPARATUS FOR PRODUCING RELATIVE MOVEMENT BETWEEN A WORKING HEAD AND CONTINUOUS STRIP
Filed April 30, 1953 4 Sheets-Sheet 1
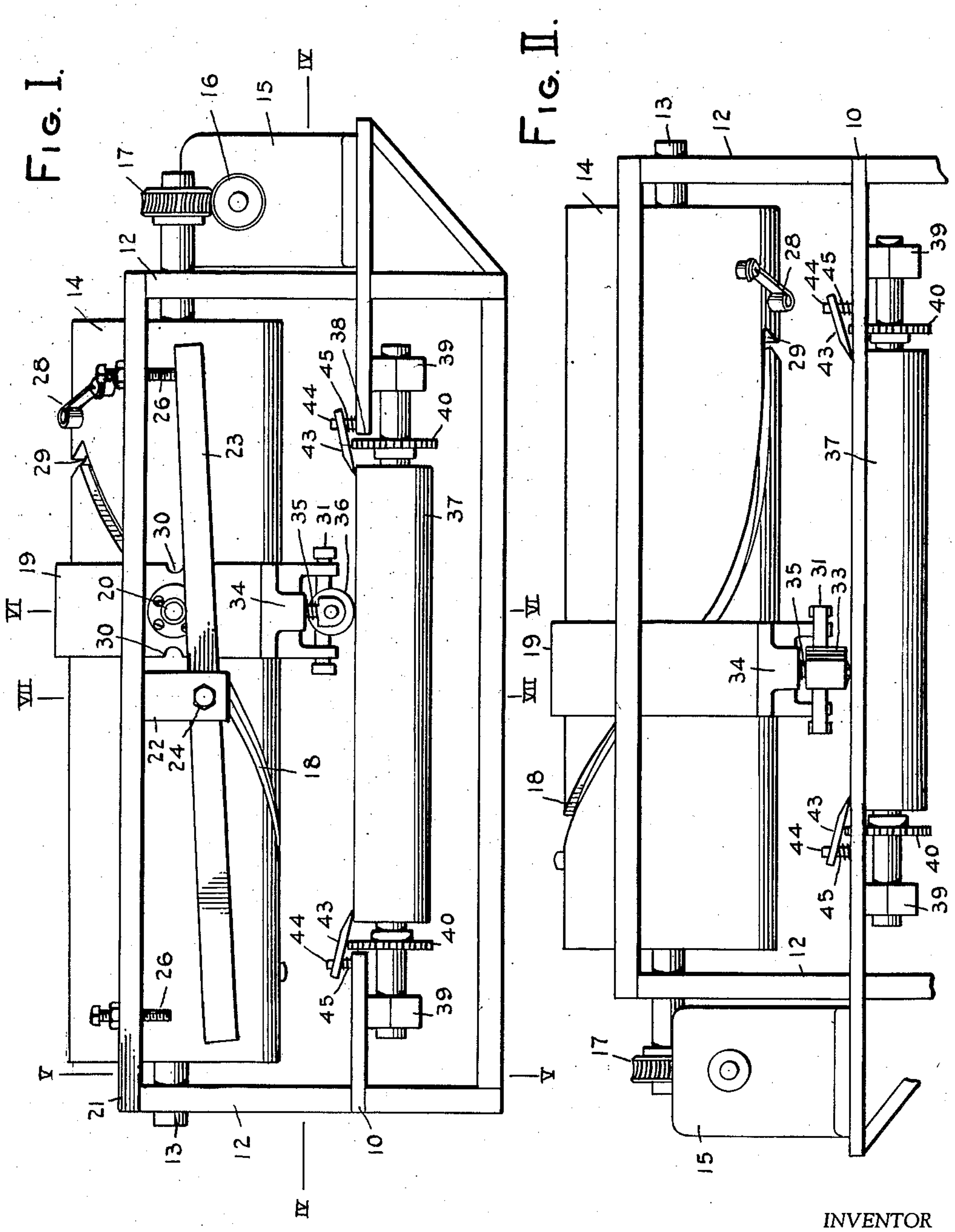
FIG. I. FIG. II.
INVENTOR
PRESTON F. MARSHALL
BY Holcombe Wetherill & Brisebois
ATTORNEY July 9, 1957 P. F. MARSHALL 2,798,725
APPARATUS FOR PRODUCING RELATIVE MOVEMENT BETWEEN A WORKING HEAD AND CONTINUOUS STRIP
Filed April 30, 1953 4 Sheets-Sheet 2
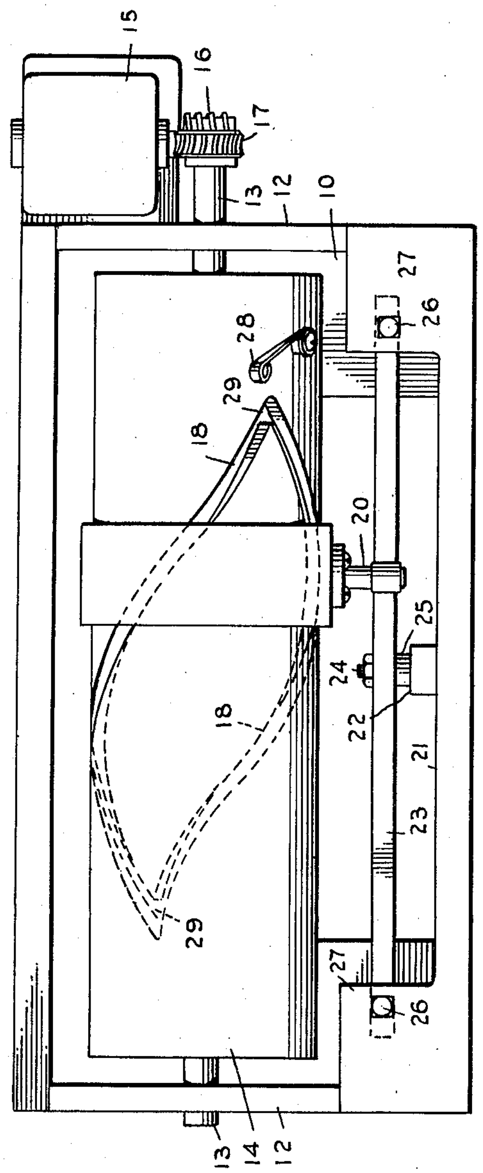
FIG. III
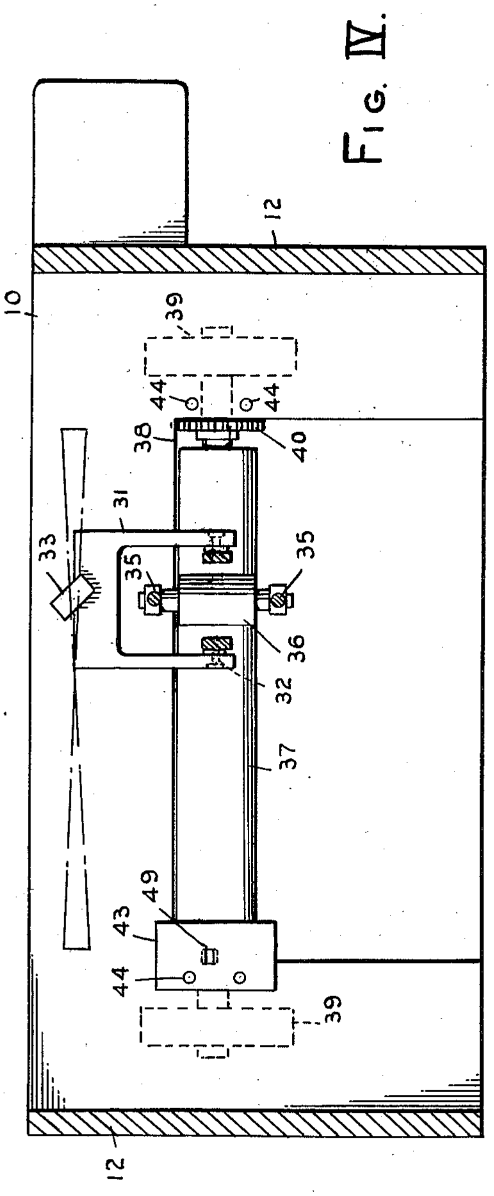
FIG. IV
INVENTOR
PRESTON F. MARSHALL
BY Holcombe Wetherill & Brisebois
ATTORNEY July 9, 1957 P. F. MARSHALL 2,798,725
APPARATUS FOR PRODUCING RELATIVE MOVEMENT BETWEEN A WORKING HEAD AND CONTINUOUS STRIP
Filed April 30, 1953 4 Sheets-Sheet 3
FIG. VI.
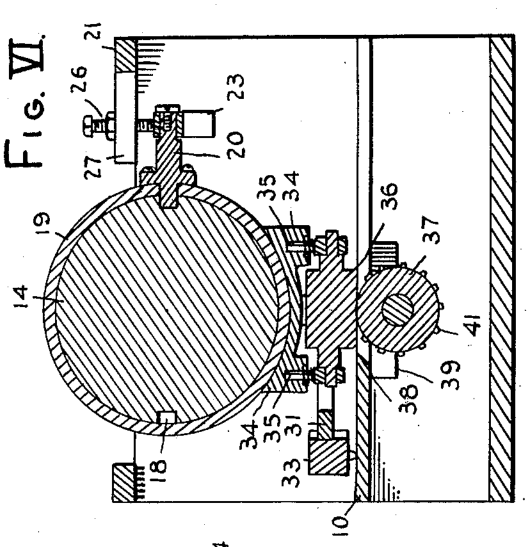
FIG. VII.
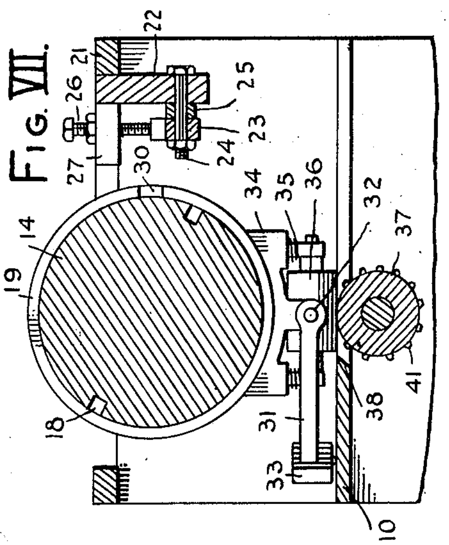
FIG. V.
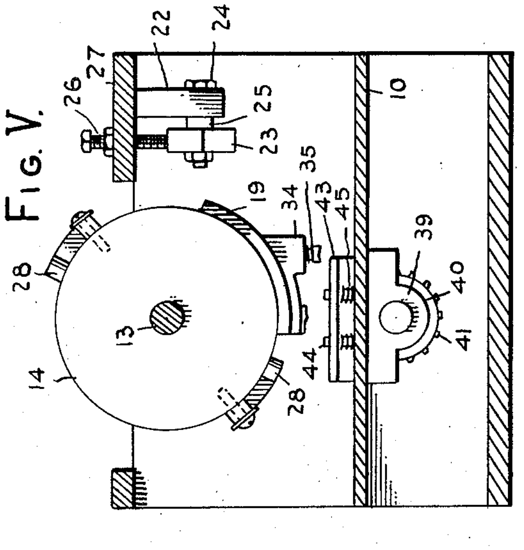
FIG. VIII.
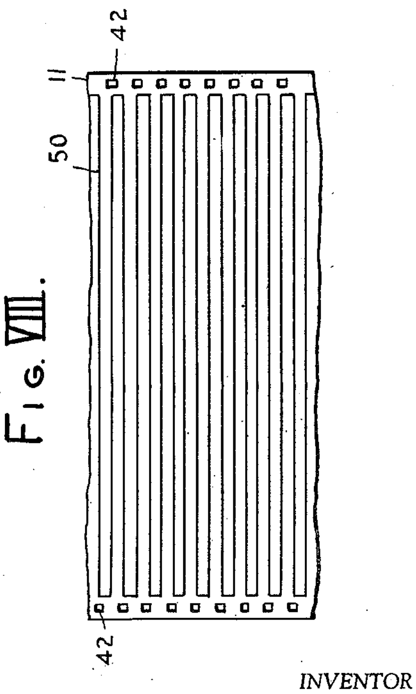
INVENTOR
PRESTON F. MARSHALL
BY Holcombe Wetherill & Brisebois
ATTORNEY FIG. IX.
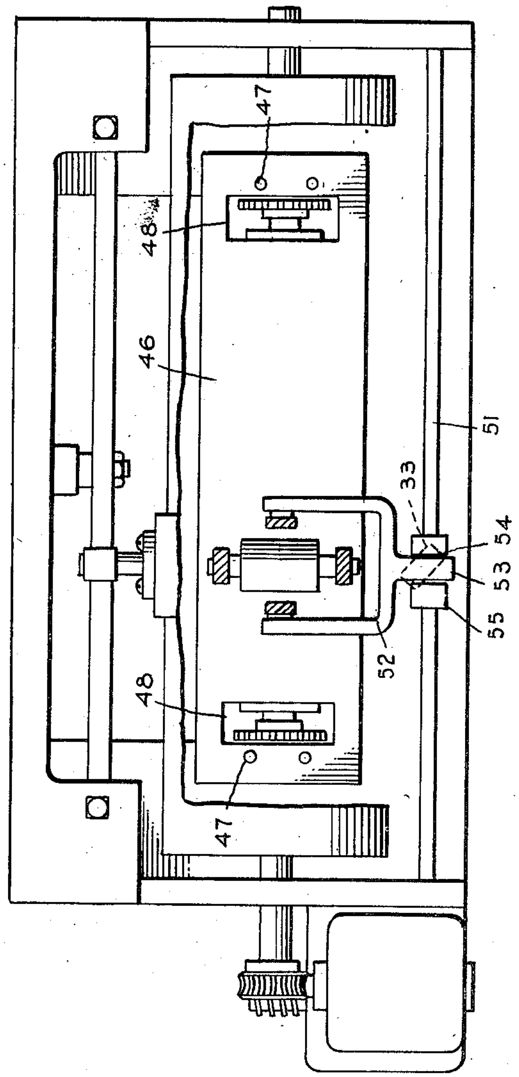
FIG. X.
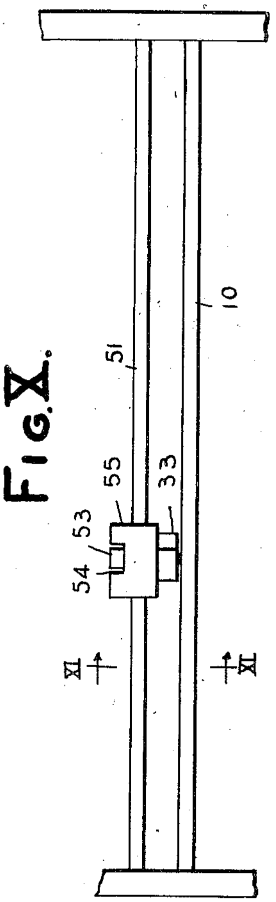
FIG. XI.
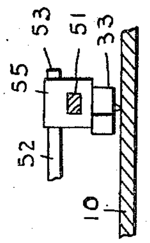
INVENTOR
PRESTON F. MARSHALL
BY Holcombe Wetherill & Brisebois
ATTORNEY United States Patent Office 2,798,725

Patented July 9, 1957

2,798,725

APPARATUS FOR PRODUCING RELATIVE MOVEMENT BETWEEN A WORKING HEAD AND CONTINUOUS STRIP

Preston F. Marshall, Chevy Chase, Md.

Application April 30, 1953, Serial No. 352,257

23 Claims. (Cl. 274—13)

My invention relates to means for producing relative movement between a working head and a broad continuous strip of relatively thin material. The configuration of the path traced by the working head relative to the strip is shown in Fig. VIII of the attached drawings.

A specific object of my invention is to apply this movement to the recording and reproducing of sound, using a wide strip as the recording medium and recording transversely of the strip rather than longitudinally thereof, as has heretofore been customary.

A further object of this invention is to provide a small light device for magnetic sound recording and reproduction which is able to record and reproduce using a medium more easily handled than tape or wire but which does not involve the bulky machinery required in previous known attempts in the use of broad band mediums.

Another object of this invention is to provide a simple magnetic sound recording and reproducting device in which the movement of the recording head is positively driven by mechanical gearing over the recording medium so as to eliminate the tape slippage problem encountered in ordinary tape recorders in which the tape is driven past the recording head by a friction drive.

Another object of my invention is to provide a device for magnetic sound recording and reproduction which eliminates or greatly reduces the tension on the recording medium so as to allow a weaker and consequently cheaper recording medium to be used and reduce the tendency for the recording medium to break under strain.

Another object of my invention is to provide a device of simple and economical construction which will allow continuous recording or reproduction to be accomplished for long periods of time such as eight hours or more.

Another object of my invention is to provide a simple mechanism having the above advantages which can be utilized in continuous sound recorders of types other than magnetic, such as microgroove.

Another object of this invention is to provide a simple recording head carrier mechanism and recording medium transport mechanism for other than sound recording such as industrial instruments recording temperature, pressure, salinity, acidity, etc.

Another object of this invention is to provide a device that uses as a recording medium a broad band which can readily be folded in accordion form so that any section of the recording can be easily found without the necessity of winding or unwinding a spool or coil. The invention is not, however, limited to the use of a strip folded in accordion form.

It will of course be obvious that means for producing the particular type of relative motion disclosed herein will have many other applications outside the recording field, as for instance in the production of textiles, and in the manufacture of electrical resistances of the "printed circuit" type.

For the purpose of explaining the mechanism of my invention I have illustrated in the accompanying drawings and will describe an embodiment thereof equipped with a sound recording and reproducing head and using as a recording medium a paper strip coated with a magnetic medium such as the magnetic medium used in standard magnetic recording tape. It will be understood of course that the invention is not limited to the use of sound recording heads but also contemplates substituting heads of the type used for recording temperature, pressures, acidity, salinity, etc., by drawing a line on a paper medium.

Like reference characters denote like parts throughout the several views, in which:

Figure I is a front elevation of my new machine;

Figure II is a rear elevation of the machine;

Figure III is a top plan view of the machine;

Figure IV is a horizontal cross-section taken along the line IV—IV of Figure I, with the path traced by the recording head shown in phantom lines and the right hand locking plate removed;

Figure V is a right vertical cross-section taken along the line V—V of Figure I, with the transport roller and recording head broken away;

Figure VI is a right vertical cross-section taken along the line VI—VI of Figure I;

Figure VII is a right vertical cross-section taken along the line VII—VII of Figure I;

Figure VIII is a plan view of the recording medium showing the path traced thereon by the recording head;

Figure IX is a plan view of an alternative embodiment of my invention, with a portion of the rotating drum broken away;

Figure X is a partial vertical elevation taken from the rear of my alternative embodiment; and Figure XI is a fragmentary vertical cross-section taken along the line XI—XI of Figure X.

As illustrated in the accompanying drawings, my device consists of a flat rectangular base plate 10, over which a strip of recording medium 11 is passed. Vertical supports 12 at either end of the base plate 10 carry in main bearings (not shown) the opposite ends of a shaft 13. A cylindrical cam or "drum" 14 is fixed to the shaft 13 and rotates therewith. This drum may be turned by any suitable drive such as an electric motor or a belt. In the example shown, a synchronous motor 15 with a built-in reduction gear drives the drum through a worm gear 16 engaging a suitable toothed gear 17 attached to the shaft 13.

A zig-zag cam groove 18 is cut into the surface of the drum 14 and a tubular travelling sleeve 19 having its geometric center at the axis of the drum and an inner diameter sufficient to allow a sliding fit therewith rides over the surface of the drum. A guide pin 20 firmly attached to the traveling sleeve with its axis normal to the surface thereof extends at one end a short distance past the outer surface of the transport sleeve and at its opposite end into the cam groove 18 in the drum 14.

A horizontal bar 21 extends between the end supports 12, parallel to and transversely spaced from the shaft 13. A small projection 22 extends downwardly from the center of the horizontal bar and a rocker arm 23 is pinned through its approximate center to this projection by means of rocker arm pin 24 (Figure VII). This pin 24 has its axis approximately perpendicular to the surface of the drum, and the rocker arm is adapted to turn about it. Between the rocker arm 23 and the projection 22 is a washer 25 of a material having a relatively high coefficient of friction. The rocker arm 23 is held by the rocker pin again this washer in such a manner as to cause the rocker arm to resist being moved by a light pressure but permit it to be moved by a moderate pressure. The amount of pressure required to move the rocker arm may be adjusted by loosening or tightening the pivot pin. It will of course be appreciated that the braking effect of the washer 25 could be secured by other means depending on the use of the complete machine and the limit of manufacturing cost set for any model.

The travel of the rocker arm is limited by two index adjustment screws 26 affixed to horizontal extensions 27 of the end supports 12, and the outer end of the guide pin 20 rides on this rocker arm.

Two spring loaded ratchets 28 are attached to the drum, one near each right angle corner 29 in the cam groove 18 and are so placed that one of them will engage the travelling sleeve at either extreme of its travel along the drum. The travelling sleeve has a recess or protuberance 30 (Figure I) at two opposite points on the sleeve to facilitate the ratchet engaging the transport sleeve. These recesses or protuberances are of a shape (determined by the type of ratchet used) which will allow the transport sleeve to become friction locked to the rotating drum at the end of the path which it traverses, but will also allow the transport sleeve to become unlocked when sufficient resistance is applied to the sleeve by the rocker arm acting on the guide pin. The ratchets may be spring-loaded ball bearings, rounded spring-loaded cam surfaces or other suitable friction ratchet mechanisms selected in accordance with the desired price and quality of the finished design. An arm 31 is pivotally attached to the travelling sleeve by means of the horizontal pin 32, and a recording head 33 is mounted on the end of this arm 31.

The travelling sleeve also carries two vertical depending cylinders 34 encircling two spring loaded pistons 35 between the lower ends of which is pivotally mounted a transport roller 36, the surface of which has a high coefficient of friction. This roller has its axis at 90 degrees to the axis of the drum and its friction surface presses the recording medium 11 against the base plate 10. The roller, by reason of its spring attachment, is capable of being moved vertically in a plane normal to the axis of the drum but is held firmly in that plane. This construction allows the roller to roll over the recording medium without causing the recording medium to move so long as its motion is purely transverse with respect to the recording medium but any motion of the roller longitudinally of the recording medium will force the recording medium in the direction of that motion.

In order to avoid the possibility that the recording medium will twist out of line when the transport roller drives it from a point located on one side or the other of it longitudinal axis, reduce friction between the recording medium and base plate, and make sure that it is easy to replace the recording medium in exactly the same position for playback purposes as during recording, an idler roller 37 may be provided below the base plate 10, with its axis parallel to that of the drum 14 and so positioned as to engage the lower surface of the recording medium 11 through the aperture 38 in the base plate along the path in which the upper surface of the recording medium is engaged by the transport roller. This idler roller 37 is rotatably journalled in the projections 39 depending from the base plate 10, and carries at either end the sprocket wheels 40 having teeth 41 adapted to engage the perforations 42 in the edges of the recording medium 11.

To further assure accuracy of movement, the number of teeth on the sprocket gear are selected so as to create a condition where the recording medium advances one tooth each stroke. This allows the slot 49 in the lock plate 43 (described below) to engage a tooth every time the transport roller reaches the end of its stroke and rides up on the lock plate, thereby forcing it down to engage the sprocket wheel. This slot in the lock plate assures that the machine is properly adjusted for the desired rate of advance of the recording medium. It will be noted that the perforations on one side of the recording strip are staggered with respect to those on the other (see Figure VIII) and the same arrangement prevails with respect to the teeth 41 on the two sprocket wheels 40.

Consequently only one perforation in the recording strip is thus engaged at a time and it is impossible to so insert the strip for playback purposes that the reproducing head moves from right to left over a passage in which the recording head moved from left to right.

At either side of the base plate over which the paper passes is a small lock-plate 43 lying on top of the recording medium and held to its position relative to the base plate by pins 44 on which the lock-plates 43 are free to ride up and down. The lock-plates are so positioned that at either extreme of the movement of the travelling sleeve the transport roller rides up on a lock-plate and locks the recording medium in position by friction. The pins 44 holding the plates are encircled by spiral springs 45 so that the plates slide up on the pins when the transport roller is not in position on the plates.

Instead of the two lock-plates 43 positioned at either end of the path of the transport roller, and designed to hold the recording sheet stationary during the indexing movement of the recording head, my device may be provided with a single lock plate 46, of the type shown in Figure IX. The holes 47 at the ends of this plate fit down on the pins 44 (Figure IV) and the plate thus prevents any contact between the transparent roller 36 and the recording sheet except when that roller passes over the two apertures 48 near either end of the plate.

With this arrangement, it will be readily appreciated that the recording medium will be held stationary at all times except during the indexing movement of the transport roller, which occurs when the travelling sleeve is locked to the drum at the end of its stroke. During this brief period the transport roller will engage and advance the recording medium while the recording head remains stationary, since if the single locking plate is used, the recording head is slidably mounted on the bar 51 and driven from the travelling sleeve 19 by means of an arm 52 pivotally attached at one end to the sleeve for motion in a vertical plane, and carrying at its other end a projection 53 which slidably engages in a slot 54 in the working head carrier 55, slidably mounted on the bar 51. This arrangement permits the head to follow the transverse motion of the travelling sleeve and transport roller without participating in the index motion which occurs when the sleeve is locked to the drum. Other arrangements serving this same purpose could obviously be designed without departing from the principle of my invention.

The type of head used depends on the medium and object of the recording. If sound is to be recorded it is possible to use a magnetic recording head or a cutting head such as used in disc records. If the head is to record such variables as pressures, temperatures, etc., by means of a scribed line a suitable head for that purpose should be employed. The head must be placed at a 45 degree angle to the axis of the drum so that it will bear approximately 45 degrees to its line of travel both in its movement across the paper and to its subsequent movement along the axis of the paper.

My machine may advantageously be adapted to use an 8½" wide strip of a suitable magnetic medium such as treated paper, 8 inches of which constitutes the recording surface with the remaining ½" serving as a border evenly divided between the two sides of the strip. The recording speed may be approximately 2¾ inches per second using a recording head which leaves a 3/32 inch magnetic imprint on the recording surface when the head is moved with its axis 45 degrees to its direction of travel.

In order to avoid having one band of magnetic imprints interfering with another, it is necessary to keep these bands separated by some appropriate distance, as for instance 1/16". The recording head must then be moved from left to right, with its axis at 45 degrees to its line of travel at a speed of 2¾ inches per second for a distance of 8 inches, transversely of the paper, then ⅛ inch along the longitudinal axis of the paper at the same speed. During this longitudinal, or index motion, its transverse velocity should be zero. After completing its index motion the recording head must again travel transversely of the paper at 2¾ inches per second but this time from right to left. At the completion of the right to left movement, the head again moves along the longitudinal axis of the paper for ⅛ inch at the rate of 2¾ inches per second. This sequence of motions is repeated continuously as shown in phantom lines on Figure IV.

To accomplish the desired motion 180 angular degrees of the drum surface is cut in a clockwise cam and 180 angular degrees of the drum surface is cut in a counterclockwise cam. These two cam cuts are constructed so as to meet at their two ends and thus form one complete 360 degree cam cut covering 8 inches of drum length. If the rocker arm were fixed parallel to the drum axis this cam would transmit to the travelling sleeve via the guide pin essentially uniform rectilinear motion from left to right and then from right to left across the recording medium. However, the index adjustment screws are positioned so as to allow the rocker to maintain an angle relative to the drum axis with a slope of about ⅛ inch in 8 inches. Under these circumstances the travelling sleeve moves not only with rectilinear motion across the recording medium but also rotates during its travel a distance sufficient to rotate the bottom of the transport roller approximately ⅛ inch per 180 degrees of drum motion, and this ⅛ inch indexing motion is transmitted by the roller to the strip of recording medium.

It was noted in the description of the spring-loaded ratchets that these ratchets operate in a manner designed to lock the rotating drum and travelling sleeve together at each extreme of the travelling sleeve's stroke and that they only become unlocked when the rocker arm exerts additional pressure on the transport sleeve via the guide pin. This locking action accomplishes two purposes. First, it reverses the position of the rocker every stroke; second, it causes the travelling sleeve to rotate a distance sufficient to rotate the bottom of the transport roller approximately ⅛ inch at the end of every stroke, in a direction opposite to that in which it turns under the influence of said rocker arm.

The diameter of the drum and the distance of the transport roller below the drum are selected so that the speed of rotation of the transport roller at the end of each stroke and the speed of translation of the transport roller during its stroke are nearly identical. In the example chosen the diameter of the drum and the distance of the transport roller below the drum are selected so that there is approximately 2½ inches between the drum axis and the bottom of the roller. Under these circumstances the speed of rotation of the roller at the end of each stroke and the speed of translation will be very nearly equal. In general the transverse stroke of the roller should be about pi times the radial distance from the center of the drum to the lower edge of the transport roller.

By these means the travelling sleeve is caused to move from left to right at a uniform speed while at the same time rotating a little less than ⅛ inch during the stroke. After reaching the end of its stroke the sleeve is locked to the drum and rotates the transport roller ⅛ inch in a plane normal to its translational stroke with a peripheral speed nearly identical to its speed of translation. It becomes unlocked after the rotation and moves from right to left at the same uniform speed this time, performing a ⅛ inch rotation in the same direction as the original ⅛ inch rotation. At the end of this stroke it again indexes ⅛ inch at uniform speed and in the direction of drum rotation. The travelling sleeve is now in a position to repeat the cycle.

The motion of the travelling sleeve as described above is used both to move the recording head over the recording medium and also to transport the recording medium through the machine. To accomplish this purpose the transport roller previously described and the recording head are attached to the travelling sleeve as heretofore described. Furthermore, lock plates are placed over the recording medium. During the left to right stroke of the transport sleeve and the right to left stroke the recording medium is moved through the device by the rotation of the transport sleeve which causes the transport roller to move slowly in the direction of the longitudinal axis of the recording medium while it rolls transversely over it. The friction between the recording medium and the transport roller forces the recording medium to move through the device. This motion has been further described in the previous description of the transport roller. During these transverse strokes the recording head moves with the same motion as the roller. Since, in the direction of the longitudinal axis of the recording medium, both the recording medium and the recording head have the same velocity the only relative motion between the recording head and the recording medium must occur transversely of the sheet. This results in the recording head recording its indicia in straight lines across the recording medium that are 90 degrees to the longitudinal axis of the recording medium during both right to left and left to right strokes. During the index movement the recording medium is held stationary by the action of the lock plates and the recording head moves over the recording medium along the longitudinal axis of the recording medium and in the direction opposite to the movement of the recording medium during the transverse strokes. It can readily be seen that the motion of the recording head over the recording medium will approximate the movement shown by the line 50 in Figure VIII. The amount of index movement can be readily controlled by turning the index adjustment screws and the speed of the recording head movement over the recording medium is determined by the speed of the drum. In the example selected a drum speed of 10.31 R. P. M. will produce a recording head speed of approximately 2¾ inches per second.

While I have, in the above description, disclosed certain practical and efficient embodiments of my invention, it will be appreciated that changes may be made in the arrangement, disposition and form of the parts without departing from the principles of my invention as defined in the accompanying claims.

For instance, the distance between the supporting arms 12 could be increased and a plurality of independently wired recording heads mounted on axial extensions from the travelling sleeve so as to permit simultaneous recording from a plurality of sources, on a broadened strip of recording medium. Alternatively, the stroke of the travelling sleeve could be shortened so as to use a strip of the same width.

What I claim is:

1. Means for driving a working head relatively to a continuous strip, comprising a reciprocating travelling member, a working head and a transport roller driven by said travelling member, supporting means adapted to receive said continuous strip, means for reciprocating said travelling member both transversely across and longitudinally with respect to said strip, the axis of said transport roller being disposed longitudinally with respect to said strip, and means for preventing driving contact between said strip and said transport roller during its movement in one direction longitudinally of said strip, frictional engagement between said roller and said strip in the opposite longitudinal direction serving to longitudinally advance said strip, the movement of said transport roller transversely of said strip serving merely to rotate said transport roller, and said working head remaining in working relationship to said strip during both transverse and longitudinal movements of said travelling member.

2. A device as claimed in claim 1 in which said working head is mounted at an angle of approximately 45 degrees to its path of travel.

3. A device as claimed in claim 2 in which said means for preventing driving contact between said strip and said transport roller comprises locking means mounted on said strip supporting means and adapted to permit insertion of said strip between said locking means and said strip supporting means, said locking means lying beneath a portion of the path travelled by said transport roller so as to permit said roller to ride up on said locking means and press it down against said strip to hold it against longitudinal motion while the transport roller traverses that portion of its path.

4. A device as claimed in claim 3 in which the locking means comprises a pair of substantially horizontal plates mounted on said sheet supporting means and extending inwardly over opposite edges of said strip.

5. A device as claimed in claim 1 in which the locking means comprises a single horizontal plate beneath the path traversed by said transport roller and overlying the sheet from a point just short of one end of said path to a point just short of its opposite end.

6. Means for driving a working head relatively to a continuously moving strip comprising a reciprocating travelling member, a working head and a transport roller separately mounted on said travelling member, supporting means adapted to receive said continuously moving strip, means for driving said travelling means diagonally across said supporting means with said working head and roller both engaging said strip, the axis of said roller being disposed longitudinally of said strip, so that the component of said roller's diagonal movement which is transverse with respect to said strip serves to move said roller transversely over said strip, whereas the component which is longitudinal with respect to said strip is transferred by said roller to said strip, and means for moving said travelling member longitudinally of said strip at either end of its reciprocating path, and means for preventing movement of said strip during said longitudinal movement of said travelling member, said working head remaining in working relationship to said strip during both diagonal and longitudinal movements of said travelling member.

7. A device as claimed in claim 6 in which said working head is mounted at an angle of approximately 45 degrees to its path of travel.

8. Means for driving a working head relative to a sheet comprising means for supporting said sheet, a drum rotatably mounted transversely of said sheet, a continuous cam encircling said drum, a rocking arm pivotally mounted parallel to said drum, reciprocating travelling means slidably mounted on said drum engaging said cam and riding on said rocking arm, stop means for limiting the motion of said rocking arm, catch means on said drum for engaging said travelling means and locking it to said drum for rotation therewith during a portion of its travel, brake means preventing rocking of said rocking arm when said travelling means is not locked to said drum, a working head driven by said travelling means for operating on said sheet and maintained continuously in working relationship thereto, a transport roller carried by said travelling means having its axis transverse to that of said drum and adapted to frictionally engage said sheet, and locking means actuated by rotation of said drum and adapted to hold said sheet stationary during a portion of said rotation.

9. A machine as claimed in claim 8 in which said locking means prevents contact between said transport roller and said sheet while said sheet is being held stationary by said locking means.

10. A machine as claimed in claim 9 in which said locking means is mounted on said sheet supporting means and adapted to permit insertion of said sheet between said locking means and said sheet supporting means, said locking means lying beneath a portion of the path travelled by said transport roller so as to permit said roller to ride upon said locking means and press it down against said sheet to hold it against longitudinal motion while the transport roller traverses that portion of its path.

11. A device as claimed in claim 10 in which said catch means are so positioned on said drum as to engage said travelling means as the direction of travel of said reciprocating travelling means is reversed at either end of its stroke.

12. A device as claimed in claim 11 in which said catch means are resiliently mounted.

13. A device as claimed in claim 12 in which said travelling means carries cooperating means for engaging with said catch means.

14. A device as claimed in claim 13 in which said travelling means comprises a sliding sleeve concentric with said drum, and carrying a guide pin normal to said drum, one end of said pin engaging said cam and the other end of said pin riding on said rocker arm.

15. Means for driving a working head relative to a sheet comprising means for supporting said sheet, a drum rotatably mounted transversely of said sheet, a continuous cam encircling said drum, a rocking arm pivotally mounted parallel to said drum, reciprocating travelling means slidably mounted on said drum engaging said cam and riding on said rocking arm, stop means for limiting the motion of said rocking arm, catch means on said drum for engaging said travelling means and locking it to said drum for rotation therewith during a portion of its travel, brake means preventing rocking of said rocking arm when said travelling means is not locked to said drum, a working head driven by said supporting means for operating on said sheet, said working head being mounted at an angle of approximately 45 degrees to the path travelled by said travelling means and maintained continuously in working relationship with respect to said sheet, a transport roller carried by said travelling means having its axis transverse to that of said drum, and aadpted to frictionally engage said sheet, and locking means on said sheet supporting means adapted to permit insertion of said sheet between said locking means and said sheet supporting means, said locking means lying beneath a portion of the path travelled by said transport roller so as to permit said roller to ride up on said locking means and press it down against said sheet to hold it against longitudinal motion while the transport roller traverses that portion of its path.

16. A device as claimed in claim 15 in which said brake means for said rocking arm comprises friction means positioned between said arm and its mounting, and means for urging said rocking arm against said friction means.

17. A device as claimed in claim 1 in which said sheet supporting means carries a freely turning roller immediately below, transversely of, and peripherally in contact with said sheet.

18. A device as claimed in claim 17 in which said freely turning roller carries at either end a sprocket wheel having teeth adapted to engage in cooperating perforations along the edges of said sheet, said sprocket wheel being fixed to said roller.

19. A device as claimed in claim 18 in which said sprocket wheels are so fixed to said freely turning roller that the teeth on one sprocket wheel are radially staggered with respect to the teeth on the other sprocket wheel.

20. A device as claimed in claim 8 in which the length of the transverse stroke of the working head is approximately pi times the radial distance from the axis of said drum to the lowest surface of the transport roller.

21. A device as claimed in claim 15 in which said locking means is biased upwardly away from said sheet.

22. A device as claimed in claim 15 in which said stop means for limiting the movement of said rocking arm are manually adjustable.

23. A device as claimed in claim 15 in which the rotation of said drum urges said travelling means into engagement with said rocking arm.

References Cited in the file of this patent

UNITED STATES PATENTS

| | | |
|---|---|---|
| 2,124,673 | Puma | July 26, 1938 |
| 2,550,803 | Goddard | May 1, 1951 |
| 2,584,922 | Reid | Feb. 5, 1952 |
| 2,657,062 | Meunier | Oct. 27, 1953 |

FOREIGN PATENTS

| | | |
|---|---|---|
| 877,126 | France | Nov. 27, 1942 |